(12) United States Patent
Montemayor et al.

(10) Patent No.: US 9,473,498 B2
(45) Date of Patent: Oct. 18, 2016

(54) METHOD FOR USING JAVA SERVLETS AS A STACK BASED STATE MACHINE

(71) Applicant: Oracle America, Inc., Redwood City, CA (US)

(72) Inventors: Oscar A. Montemayor, San Jose, CA (US); Matthew R. Hill, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 129 days.

(21) Appl. No.: 13/967,266

(22) Filed: Aug. 14, 2013

(65) Prior Publication Data

US 2013/0332999 A1 Dec. 12, 2013

Related U.S. Application Data

(63) Continuation of application No. 10/877,350, filed on Jun. 25, 2004, now abandoned.

(51) Int. Cl.

| | |
|---|---|
| G06F 15/16 | (2006.01) |
| H04L 29/06 | (2006.01) |
| G06F 9/50 | (2006.01) |
| H04L 9/32 | (2006.01) |
| H04L 9/00 | (2006.01) |
| H04N 1/44 | (2006.01) |
| H04L 29/08 | (2006.01) |

(52) U.S. Cl.
CPC ............ *H04L 63/10* (2013.01); *G06F 9/5027* (2013.01); *H04L 9/006* (2013.01); *H04L 9/3226* (2013.01); *H04L 29/06802* (2013.01); *H04L 63/00* (2013.01); *H04L 63/0853* (2013.01); *H04L 67/14* (2013.01); *H04L 67/327* (2013.01); *H04N 1/4413* (2013.01)

(58) Field of Classification Search
CPC . H04L 63/10; H04L 63/0853; H04L 9/0877; H04L 9/3234; H04L 63/10; H04L 9/006; H04L 9/3226; H04L 29/06802; H04L 67/14; H04L 67/327; G06F 9/5027
See application file for complete search history.

(56) References Cited

U.S. PATENT DOCUMENTS

| | | | | |
|---|---|---|---|---|
| 6,005,942 | A * | 12/1999 | Chan et al. | ................... 713/187 |
| 7,024,226 | B2 * | 4/2006 | Sandberg et al. | ............. 455/558 |
| 7,085,386 | B2 * | 8/2006 | Audebert et al. | ............. 380/281 |
| 7,117,364 | B1 * | 10/2006 | Hepper et al. | ................ 713/176 |
| 7,536,722 | B1 * | 5/2009 | Saltz | ...................... G06F 21/33 726/20 |
| 7,617,390 | B2 * | 11/2009 | Sharma | ............... G06Q 20/341 380/278 |
| 2002/0100798 | A1 * | 8/2002 | Farrugia et al. | ............. 235/380 |
| 2002/0112170 | A1 | 8/2002 | Foley et al. | ................... 713/184 |
| 2004/0167984 | A1 * | 8/2004 | Herrmann | ...................... 709/229 |
| 2004/0250066 | A1 * | 12/2004 | Di Luoffo et al. | ........... 713/168 |
| 2013/0332999 | A1 * | 12/2013 | Montemayor | ........ G06F 9/5027 726/4 |

FOREIGN PATENT DOCUMENTS

EP    1 24 9981 A1    10/2002    ............. H04L 29/06

OTHER PUBLICATIONS

Chan, "Web-enabled smart card for ubiquitous access of patient's medical record", Computer Networks, Elsevier Science Pub. B.V., Amsterdam, NL, vol. 31, No. 11-16, May 17, 1999, pp. 1591-1598, XP004304576, ISSN: 1389-1286, DOI: 10,1016/S1389-1286 (1999) 00056-0 p. 1592-1597.

\* cited by examiner

*Primary Examiner* — Krisna Lim
(74) *Attorney, Agent, or Firm* — Martine Penilla Group, LLP

(57) ABSTRACT

A client module downloaded by web browser from a server receives authentication information to open a smart card in a card reader and to initiate a secure network connection to a first server module running on a server. The client module calls a second server module running on the server. And the client module receives a new application for the smart card. Then the client module causes the smart card to delete an old application and load the new application. Each of the operations performed by client module occurs in a single session.

34 Claims, 4 Drawing Sheets

METHOD FOR USING JAVA SERVLETS AS A STACK BASED STATE MACHINE

CROSS REFERENCE TO RELATED APPLICATIONS

This application is a continuation application of U.S. patent application Ser. No. 10/877,350, filed on Jun. 25, 2004, also entitled "Method for Using Java Servlets as a Stack Based State Machine". This application is related to U.S. patent application Ser. No. 10/877,743 (now U.S. Pat. No. 8,447,984), filed on Jun. 25, 2004, entitled "Authentication System and Method for Operating the Same", and U.S. patent application Ser. No. 10/877,842 (now U.S. Pat. No. 7,617,390), filed on Jun. 25, 2004, entitled "Server Authentication in Non-Secure Channel Card Pin Reset Methods and Computer Implemented Processes". The disclosures of all of the above applications are herein incorporated by reference in their entirety for all purposes.

BACKGROUND OF THE INVENTION

1. Field of the Invention

The present invention relates generally to a client/server relationship, and more specifically to a client server relationship where the server drives an applet of the client after the client initiates communication.

2. Description of the Related Art

In a client server relationship, especially when dealing with a web server that utilizes the Hyper Text Transport Protocol (HTTP), the communication scheme is based on a request-response protocol. The general communication mechanism for client-server applications is provided by the Remote Procedure Call (RPC) protocol. Remote procedure calls provide a framework for implementing remote access to a system. They create a distributed computing environment that is established and controlled at the procedure level within an application. An RPC server consists of a collection of procedures that a client can call by sending an RPC request to the server along with the procedure parameters. The server will invoke the indicated procedure on behalf of the client, handing back the return value, if there is any. Thus, the caller, i.e., client, sends a call message and waits for the reply. On the server side a process is dormant awaiting the arrival of call messages. When a call message arrives, the server process extracts the procedure parameters, computes the results and sends them back in a reply message.

However, there may be situations where the server is the logical driver of the operation. One such example occurs for provisioning smart cards, such as Java Cards, where the server determines what should be loaded and invokes the card operation as needed. The Java 2 Enterprise Edition Java Servlet API provides an easy, scalable framework that could be used by a Provisioning Server to talk to a client via HTTP or HTTPS protocols. Thus, Java Applets can take advantage of full browser functionality to talk to the server and the card, which would be an ideal platform for Web-based development.

The Java Servlet framework provides a basic HTTP-based API on top of which to program applications. All HTTP requests are done either using GET or POST methods. The Java servlet framework provides methods for such requests such as doGet ( . . . ) and doPost ( . . . ). By default, both types of requests are forwarded to a processRequest ( . . . ) method. There is one shortcoming with this scheme. HTTP is a request-response protocol. Accordingly, the server always expects a request before issuing a reply with data. In case of a smart card, the card is also a command-response device. When provisioning a Java Card, the master key is located on a hardware security module (HSM) to which the server has access, but the client does not have access. Due to this configuration, the Server, the back end system, must drive the personalization process in the client, the front end system, after the client has requested the Provisioning Server to begin its work.

In light of the foregoing, it is desirable to implement a scheme for allowing a back end system to drive the front end system.

SUMMARY OF THE INVENTION

Broadly speaking, the present invention fills these needs by providing a scheme controlling a front end system through a back end system. The present invention can be implemented in numerous ways, including as a system, an apparatus, or a method. Several embodiments of the present invention are described below.

In one embodiment, a method for driving a client browser applet from a server is provided. The method initiates with receiving a request from the client browser applet. The method includes checking session state variables for a servlet receiving the request and executing functionality associated with the request based on information associated with the session state variables. It is then determined whether to return control to the client browser applet, wherein if it is determined not to return control to the client, the method includes storing a state associated with the servlet in the session state variables and transmitting both a command and data to the client browser applet.

In another embodiment, a method for enabling a front end system applet to be driven by a back end system servlet is provided. The method includes initiating a session with the back end system servlet for service. Then, both, data associated with the service and a command, are received from the back end system. Next, the command is parsed. It is then determined whether control is to be returned to the front end system applet, wherein if it is determined not to return control to the front end system applet, the method includes, executing the command, returning status and data to back end system, and awaiting receipt of additional data and command associated with the service from the back end system.

In yet another embodiment, a computer readable medium having program instructions for driving a client browser applet from a server is provided. The computer readable medium includes program instructions for receiving a request from the client browser applet. Program instructions for checking session state variables for a servlet receiving the request and program instructions for executing functionality associated with the request are included. Program instructions for determining whether to return control to the client browser applet are included. Program instructions for storing a state associated with the servlet in the session state variables and program instructions for transmitting both a command and data to the client browser applet are provided.

A computer readable medium having program instructions for enabling a front end system applet to be driven by a back end system servlet is provided. The computer readable medium includes program instructions for initiating a session with the back end system servlet for service and program instructions for receiving both, data associated with the service and a command, from the back end system.

Program instructions for parsing the command and program instructions for determining whether control is to be returned to the front end system applet are included. Program instructions for executing the command and program instructions for returning status and data to the back end system are provided. Program instructions for awaiting receipt of additional data and command associated with the service from the back end system.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

An invention is described for a system and method for driving a front end system, i.e., a browser applet of a client, through a back end system, i.e., a server. It will be obvious, however, to one skilled in the art, that the present invention may be practiced without some or all of these specific details. In other instances, well known process operations have not been described in detail in order not to unnecessarily obscure the present invention.

The embodiments of the present invention provide a method and protocol for enabling a server to drive a session between Java servlets running on the server and browser applets running on the client. Once a browser applet is downloaded to the browser, e.g., from a provisioning page, the browser applet invokes a servlet to initiate the corresponding process. The browser will receive data and an indicator of what task to perform next, e.g., what to request next from the server, from each procedure call to the servlet. Thus, the embodiments described herein convert the browser applet into a passive relay. It should be appreciated that while the embodiments are at times described below with reference to provisioning a Java card, this reference is not meant to limit the embodiments to provisioning a Java card. That is, the embodiments described herein may be incorporated into any suitable system where a set of Java servlets is required to drive an interaction with a client process.

Figure 1:
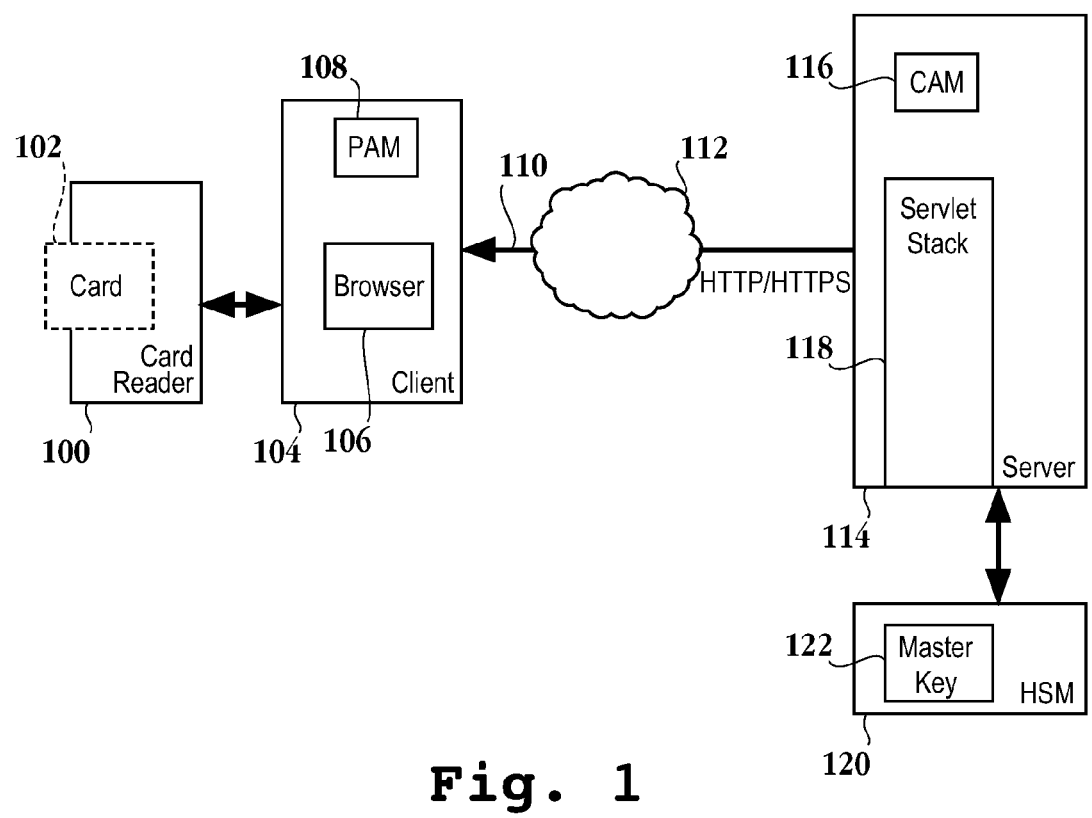
FIG. 1 is a simplified schematic diagram illustrating a client-server relationship enabling a server to drive a personalization process in the client in accordance with one embodiment of the invention.

FIG. 1 is a simplified schematic diagram illustrating a client-server relationship enabling a server to drive a personalization process in the client in accordance with one embodiment of the invention. Here, the client side includes client 104 in communication with card reader 100. Card reader 100 is configured to receive and read card 102. Card 102 may be any suitable card, such as a Java Card. Client 104 includes browser application 106 and pluggable authentication module (PAM) 108. PAM 108 represents custom code for communication with card 102. One skilled in the art will appreciate that PAM 108 represents a pluggable framework for UNIX systems to perform authentication. Client 104 is in communication with server 114 through Hyper Text Transport Protocol/Hyper Text Transport Protocol Secure sockets (HTTP/HTTPS) connection 110 over distributed network 112. Of course, distributed network 112 includes the Internet. Server 114 includes servlet stack 118 and custom authentication module 116. Custom authentication module 116 includes the functionality that enables a challenge/response protocol to be executed between client 104 and server 114. Client 104 and server 114 communicate through communication channel 110. Some parts of the between client 104 and server 114 will be performed over a secure channel, that may be established according to the Global Platform Specification. When a secure channel is used, e.g., when provisioning a smart card, it should be appreciated that the client browser applet acts as a passive relay and is not an endpoint of the secure channel. Servlet stack 118 includes a plurality of servlets, some of which may be provisioning servlets. In one embodiment, the servlets of servlet stack 118 are organized by function so that they can be reused. Each servlet can consist of several steps and the step currently being executed is saved in servlet stack 118. Server 114 is in communication with hardware security module (HSM) 120. HSM 120 includes master key 122. One skilled in the art will appreciate that master key 122 is required to provision smart card 102 as well as establish secure channel 110. Of course, server 114 and client 104 include the necessary computing components (hardware and software) to function as described herein, e.g., processor(s) and memory.

It should be further appreciated that with reference to the specific application for provisioning Java card 102, the client browser does not have access to master key 122 in HSM 120. Thus, server 114, which has access to master key 122, is configured to drive the session for provisioning card 102, as described in more detail below. In one aspect, the client browser applet is designed as an interactive component that repeatedly calls the servlet in order to advance the process.

Java Servlets have the ability to keep a state per session. A state can be stored as state variables, which are preserved within one session. A session, as used herein, refers to the interactive dialog between a specific user and a web server, as the user moves through several web pages. When a specific user first hits the web server, a session identifier (ID) value is assigned to a session, which helps the servlet retrieve state information, referred to as session attributes. In a specific example with reference to provisioning a Java card, the user may access a provisioning page which downloads a browser applet to the client, thereby causing the session ID to be assigned. The servlet keeps a state, which is used to resolve what action to perform next. The applet keeps a minimum state, and calls the servlet repeatedly to drive the process. With reference to provisioning a Java card, the applet is the entity responsible for communicating with the card in a command-response fashion. The above-described properties of the servlet enable the client to be configured to constantly poll the servlet as to what commands to pass to the card, thereby simplifying the client architecture, i.e., the client may be a thin client. It should be appreciated that the fact that the client browser applet keeps a minimum state further enhances the simplification of the client design.

In order to keep the client browser applet simple and flexible, the servlet is the entity that keeps the stack. Thus, the client browser applet is provided information for which servlet to call when receiving data from the servlet stack. In the embodiment for provisioning a Java card, a protocol of commands between the applet and the servlet is established. Exemplary commands that perform the following tasks are listed below:

a) Send Application Protocol Data Units (APDUs) to the card, and return data to the servlet;
b) Change servlet to be called to another specified servlet;
c) Display images/messages to the user;
d) End servlet interaction, and return control to the applet;
e) Query the user for a card personal identification number (PIN).

The above list of commands is not meant to be limiting, as the commands are exemplary. That is, any suitable additional commands for communication between the applet and the servlet may be incorporated into the protocol of commands depending on the application. In one embodiment, the ADPUs correspond to ISO7816-4 ADPUs. It should be appreciated that the protocol described herein can be implemented via serialized command objects, whose classes are accessible by both applet and servlets. Return data can be sent from the applet to the servlet using standard HTTP variables, which the servlet is responsible for decoding. Since the applet state is kept to a minimum for design simplification, the servlet is responsible for handling any errors returned by the card.

Figure 2:
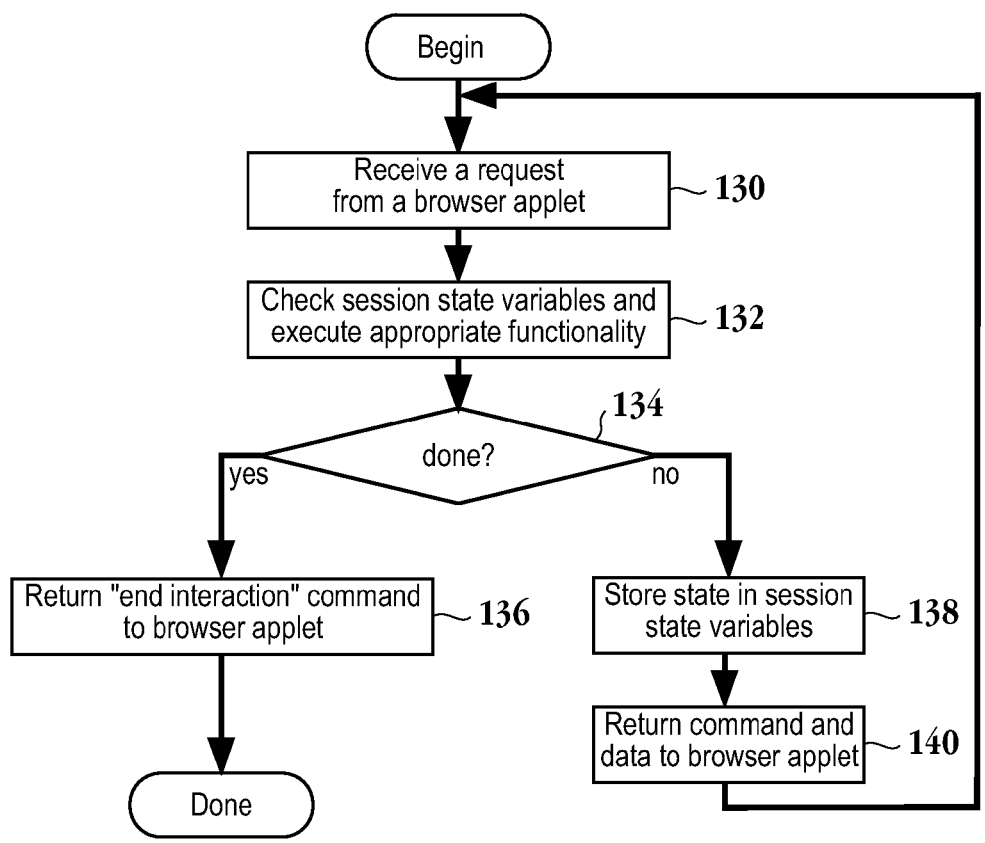
FIG. 2 is a flow chart diagram illustrating the method operations for driving a client browser applet from a server in accordance with one embodiment of the invention.

FIG. 2 is a flow chart diagram illustrating the method operations for driving a client browser applet from a server in accordance with one embodiment of the invention. FIG. 2 represents a view from the server side of FIG. 1. The method initiates with operation 130 where a request from a browser applet is received. For example, the browser of a client and a server may be in communication according to the remote procedure call protocol. As described above, a smart card may be provisioned through these embodiments. The method then advances to operation 132 where session state variables are checked and the appropriate functionality is executed. Examples of functionality being executed include the servlet receiving a provisioning request with a SSO token identifying the user and the card CUID, and the servlet checking its configuration to determine what must be provisioned. For example, the servlet might access the card's master key from the HSM, make requests to other servers such as a certificate authority, and then use that information to set up a secure channel with the card via the browser applet in order to perform the following: delete some specified card applets, load one or more new card applets, request the newly loaded card applet to generate a PKI keypair, etc.

In decision operation 134 of FIG. 2, it is determined whether to return control to the client browser applet. If it is determined to return control to the client browser applet, the method advances to operation 136 where an "end interaction" command is returned to the browser applet from the server. If it is determined not to return control to the client, then the method moves to operation 138 where the corresponding state is stored in the session state variables. The method then proceeds to operation 140 where a command and data are returned to the browser applet. Here, the command includes instructions on what the client browser applet is to perform next. It should be noted that the commands listed in the protocol of commands above are exemplary commands that may be included here. After operation 140 the method returns to operation 30 and repeats as described above.

Figure 3:
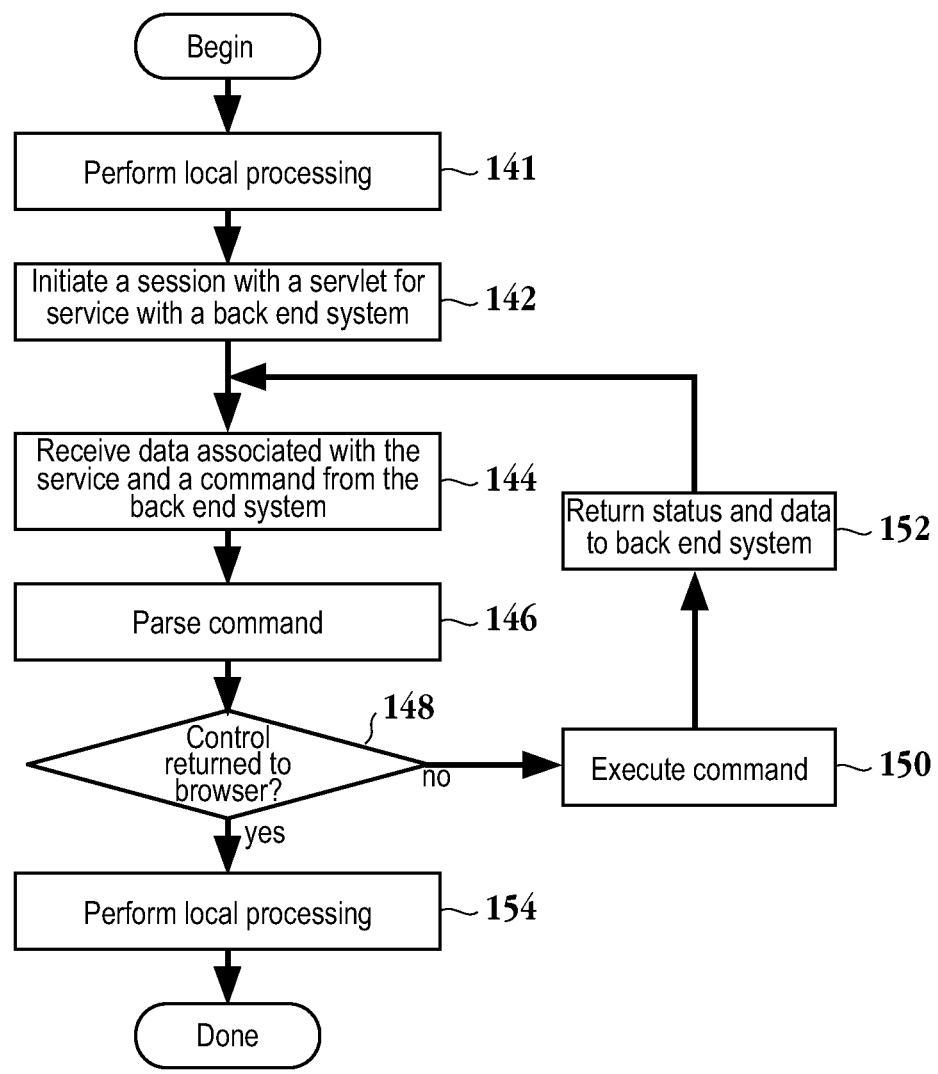
FIG. 3 is a flow chart diagram illustrating the method operations for enabling a front end system applet to be driven by a back end system servlet in accordance with one embodiment of the invention.

FIG. 3 is a flow chart diagram illustrating the method operations for enabling a front end system applet to be driven by a back end system servlet in accordance with one embodiment of the invention. It should be appreciated that FIG. 3 represents the client side view. The method initiates with operation 141 where local processing is performed. For example, with reference to a Java card application, the browser applet may request a PIN from the user to open the card. It should be appreciated that the local processing of operation 141 is optional and does not necessarily need to be performed if there is no local processing to be executed. The method then advances to operation 142 where a session is initiated with a servlet for service with a back end system. Here, a request is submitted to the server from the client. The method then advances to operation 144 where data associated with the service and a command from the back end system is received by the browser applet. Thus, the server responds to the request with data and a command, such as the commands listed above. The method then moves to operation 146 where the command of operation 144 is parsed to determine what the command is. It should be appreciated that the command represents instructions on how to handle the data received in operation 144.

The method of FIG. 3 then moves to decision operation 148 where it is determined whether control is to be returned to the front end system applet, i.e., the browser. If it is determined not to return control to the front end system applet, the method moves to operation 150 where the command is executed. It should be appreciated that during the execution of the command, local processing is not allowed except for a response to a limited set of preset command options. Following execution of the command, the method advances to operation 152 where a status and data is returned to the back end system. For example, one APDU exchange brokered by the browser applet has the servlet request the card applet to generate a key pair, and to return the public key to the servlet. Alternatively, the servlet might request the card applet to encrypt some data with its private key and return the result. Once the status and data are returned to the back end system, the method returns to operation 144 and repeats as described above. If control is to be returned to the browser, i.e., a command equal to "end processing," then the method advances to operation 154 where local processing may be performed. For example, with reference to a Java card application, the browser applet may close the card in response to the end processing command. As above with reference to operation 141, the performance of local processing is optional.

Figure 4:
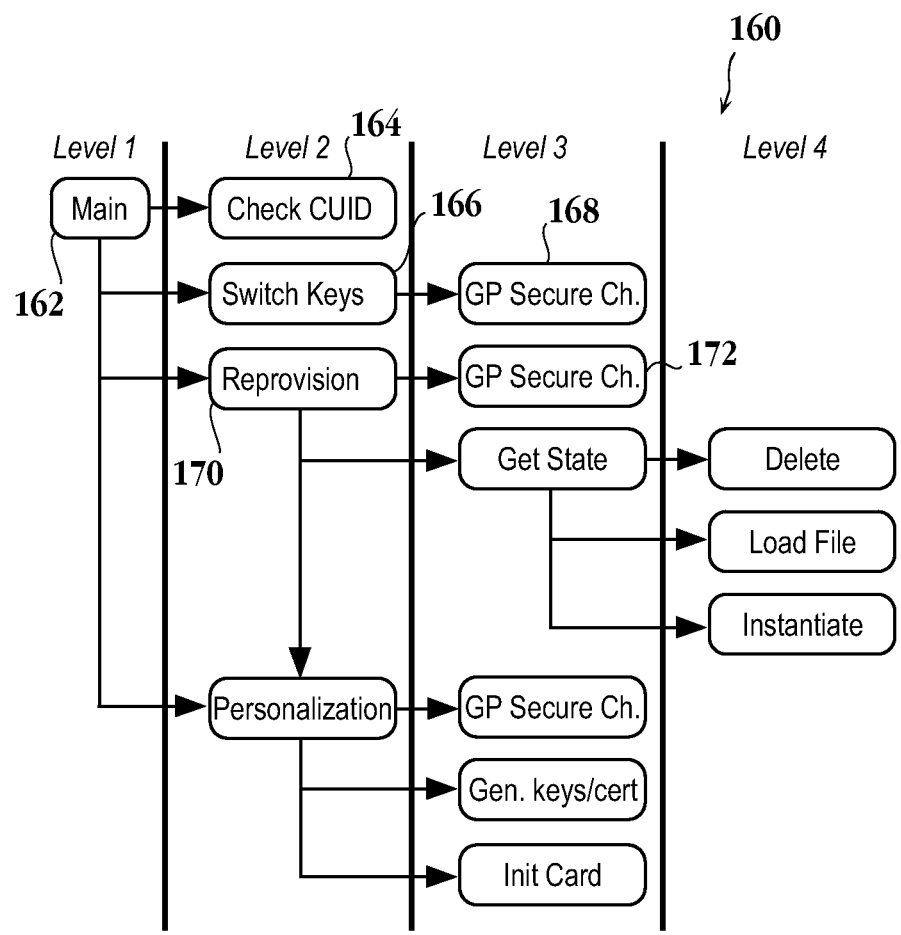
FIG. 4 is a simplified schematic diagram illustrating how different servlet calls may be stacked in the system in accordance with one embodiment of the invention.

FIG. 4 is a simplified schematic diagram illustrating how different servlet calls may be stacked in the system in accordance with one embodiment of the invention. Here, a number of servlets are depicted in levels one through four, which represent levels of nesting of the stack in diagram 160. For example, main servlet 162 is the first invocation that the browser applet would make. When main servlet 162 is executing and gets to a point where the main servlet needs to call another servlet, e.g., check card unique identifier (CUID) servlet 164, then main servlet 162 pushes itself onto the servlet stack. It should be appreciated that the servlet stack may be embodied as a session variable configured as a list. Thus, an identifier representing main servlet 162 is added to the list. Thus, an identifier for main servlet 162 is at the top of the list (at this point it is the only identifier in the list) and the identifier would communicate to the browser applet to call check CUID servlet 164. As check CUID servlet 164 does not advance to any further levels in the nesting, check CUID servlet communicates to the browser applet to call main servlet 162, which then directs the browser applet to call switch keys servlet 166. It should be appreciated that check CUID servlet 164 identifies main servlet 162 to be called when check CUID servlet is done, as the identifier for the main servlet is at the top of the list.

Switch keys servlet 166 goes one level deeper, i.e., pushes itself onto the top of the stack and communicates to the browser applet to call Global Platform (GP) secure channel servlet 168. GP secure channel servlet 168 sets up the APDUs that set up the secure channel. In the case of provisioning a Java card, the secure channel is established between a card applet and GP secure channel servlet 168. While GP secure channel servlet 168 is executing, there are two servlets on the stack, i.e., switch keys servlet 166 at the top and main servlet 162 below. GP secure channel servlet 168 is not necessarily aware of whether there is more work to do in switch keys servlet 166, so the GP secure channel "pops" the top entry off of the servlet stack, i.e., the switch keys servlet, and directs the browser applet to contact the Switch keys servlet. The browser applet will contact switch keys servlet 166, which has saved session state, and switch keys will continue it's processing with the browser applet until the processing is complete. At completion of processing switch keys servlet 166 will pop the next entry off the stack, i.e., Main servlet 162, and direct the browser applet to invoke Main. Main servlet 162 also has saved session state and directs the browser applet to contact reprovision servlet 170 after pushing itself on the stack. Reprovision servlet 170 pushes itself onto the top of the stack and communicates to the browser applet to call GP secure channel servlet 172. The remaining servlets of diagram 160 execute in a similar fashion to the scheme described above and are shown for exemplary purposes.

In summary, the present invention provides a scheme for having a back end system drive the interaction with a client process. Thus, Java servlets operating on a request/response paradigm are enabled to drive the interaction with the client. Here, the browser applet acts as a state machine that sends its state to the servlet stack and then moves from one state to the next, i.e., the browser applet acts as an intermediary allowing to drive the interaction with the clients. It should be further appreciated that the secure channel mentioned above with reference to provisioning a Java card is a logical connection between the servlet and a card applet with the client browser applet acting a passive relay. The secure channel may be set up for secure communications, such as provisioning a card, however, the secure channel is not needed for non-secure communications.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method, comprising the operations of:
    using authentication information to open a smart card in a card reader and to initiate a secure network connection to a first server module running on a server;
    calling a second server module running on the server, wherein the second server module is a reprovision module identified in a command received from another server module running on the server;
    receiving a new application for the smart card; and
    causing the smart card to delete an old application and load the new application, wherein each of the operations is performed in a single session by a client module downloaded by a web browser from the server and wherein the client module executes on one or more processors.

2. The method of claim 1, further comprising the operation of:
    instructing the new application to generate a Public Key Infrastructure (PKI) keypair.

3. The method of claim 1, wherein the authentication information includes information from a personal identification number (PIN) entered by a user.

4. The method of claim 1, wherein the authentication information includes a card unique ID (CUID) received from the smart card.

5. The method of claim 1, wherein the authentication information is obtained at least in part through the use of a pluggable authentication module (PAM).

6. The method of claim 1, wherein the secure network connection is based at least in part on a master key for the smart card stored in a hardware security module (HSM) on the server.

7. The method of claim 1, wherein the applications are applets and the server modules are servlets.

8. The method of claim 1, wherein the client module is an applet.

9. The method of claim 1, wherein the authentication information includes information from a personal identification number (PIN) entered by a user, wherein the authentication information is obtained at least in part through the use of a pluggable authentication module (PAM), and wherein the client module and the applications are applets and the server modules are servlets.

10. One or more computer-readable media that are non-transitory and that store a program, wherein the program, when executed, instructs a processor to perform the following operations:
    use authentication information to open a smart card in a card reader and to initiate a secure network connection to a first server module running on a server;
    call a second server module running on the server, wherein the second server module is a reprovision module identified in a command received from another server module running on the server;
    receive a new application for the smart card; and
    cause the smart card to delete an old application and load the new application, wherein each of the operations is performed in a single session by a client module downloaded by a web browser from the server.

11. The computer-readable media of claim 10, further comprising the operation of:
    instructing the new application to generate a Public Key Infrastructure (PKI) keypair.

12. The computer-readable media of claim 10, wherein the authentication information includes information from a personal identification number (PIN) entered by a user.

13. The computer-readable media of claim 9, wherein the authentication information includes a card unique ID (CUID) received from the smart card.

14. The computer-readable media of claim 10, wherein the authentication information is obtained at least in part through the use of a pluggable authentication module (PAM).

15. The computer-readable media of claim 10, wherein the secure network connection is based at least in part on a master key for the smart card stored in a hardware security module (HSM) on the server.

16. The computer-readable media of claim 10, wherein the applications are applets and the server modules are servlets.

17. The computer-readable media of claim 10, wherein the client module is an applet.

18. The computer-readable media of claim 10, wherein the authentication information includes information from a personal identification number (PIN) entered by a user, wherein the authentication information is obtained at least in part through the use of a pluggable authentication module (PAM), and wherein the client module and the applications are applets and the server modules are servlets.

19. A method, comprising the operations of:
    using authentication information to open a smart card in a card reader and to initiate a secure network connection to a first servlet running on a server;
    calling a second servlet running on the server, wherein the second servlet is a reprovision module identified in a command received from another server module running on the server;
    receiving a new applet for the smart card; and
    causing the smart card to delete an old applet and load the new applet, wherein each of the operations is performed in a single session by a client module downloaded by a web browser from the server and wherein the client module executes on one or more processors.

20. The method of claim 19, wherein the client module is an applet.

21. The method of claim 19, further comprising the operation of:
    instructing the new applet to generate a Public Key Infrastructure (PKI) keypair.

22. The method of claim 19, wherein the authentication information includes information from a personal identification number (PIN) entered by a user.

23. The method of claim 19, wherein the authentication information includes a card unique ID (CUID) received from the smart card.

24. The method of claim 19, wherein the authentication information is obtained at least in part through the use of a pluggable authentication module (PAM).

25. The method of claim 19, wherein the secure network connection is based at least in part on a master key for the smart card stored in a hardware security module (HSM) on the server.

26. The method of claim 19, wherein the authentication information includes information from a personal identification number (PIN) entered by a user, wherein the authentication information is obtained at least in part through the use of a pluggable authentication module (PAM), and wherein the client module is an applet.

27. One or more computer-readable media that are non-transitory and that store a program, wherein the program, when executed, instructs a processor to perform the following operations:
    use authentication information to open a smart card in a card reader and to initiate a secure network connection to a first servlet running on a server;
    call a second servlet running on the server, wherein the second servlet is a reprovision module identified in a command received from another server module running on the server;
    receive a new applet for the smart card; and
    cause the smart card to delete an old applet and load the new applet, wherein each of the operations is performed in a single session by a client module downloaded by a web browser from the server.

28. The computer-readable media of claim 27, wherein the client module is an applet.

29. The computer-readable media of claim 27, further comprising the operation of:
    instruct the new applet to generate a Public Key Infrastructure (PKI) keypair.

30. The computer-readable media of claim 27, wherein the authentication information includes information from a personal identification number (PIN) entered by a user.

31. The computer-readable media of claim 27, wherein the authentication information includes a card unique ID (CUID) received from the smart card.

32. The computer-readable media of claim 27, wherein the authentication information is obtained at least in part through the use of a pluggable authentication module (PAM).

33. The computer-readable media of claim 27, wherein the secure network connection is based at least in part on a master key for the smart card stored in a hardware security module (HSM) on the server.

34. The computer-readable media of claim 27, wherein the authentication information includes information from a personal identification number (PIN) entered by a user, wherein the authentication information is obtained at least in part through the use of a pluggable authentication module (PAM), and wherein the client module is an applet.

* * * * *